3,022,148
OIL QUENCH PROCESS FOR PARTIAL OXIDATION OF HYDROCARBON GASES
George Russell James, Armonk, N.Y., assignor to Chemical Construction Corporation, New York, N.Y., a corporation of Delaware
Filed Nov. 18, 1958, Ser. No. 774,549
5 Claims. (Cl. 48—215)

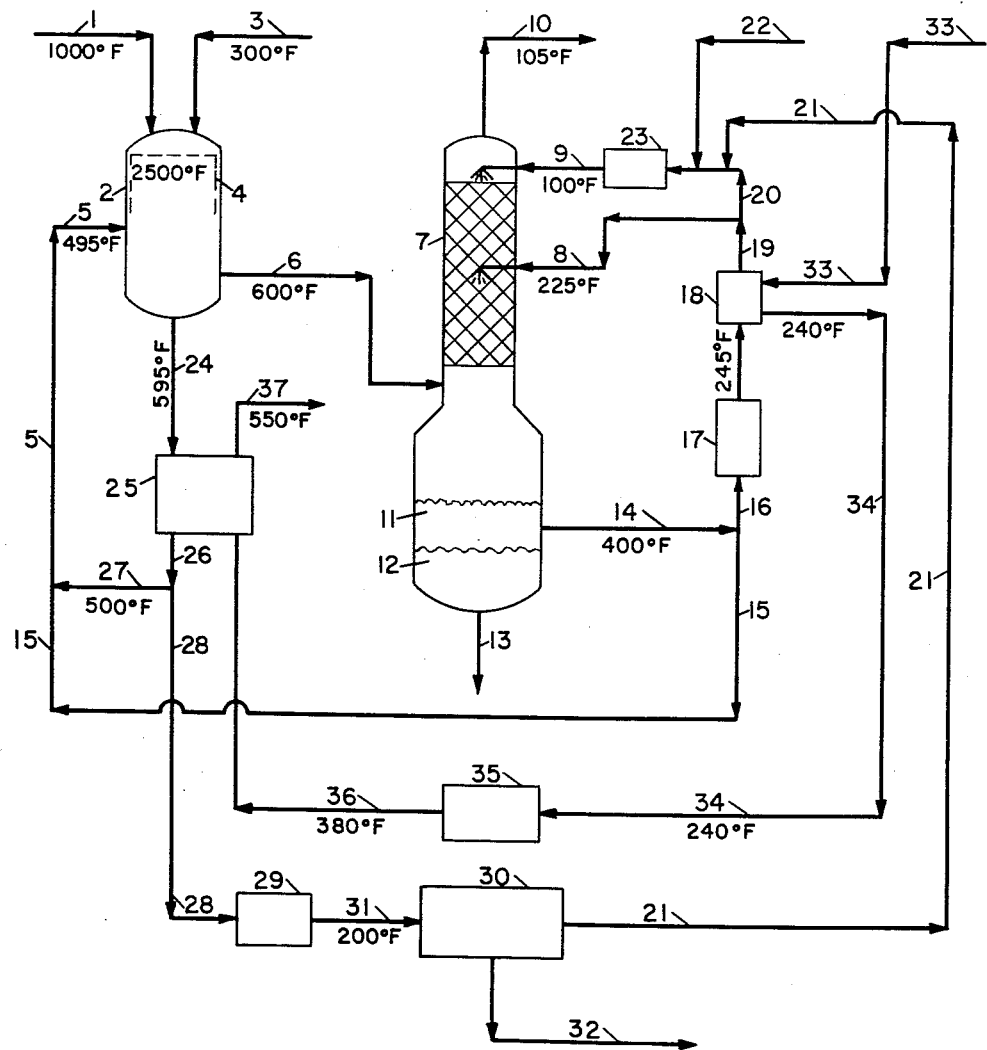
G. RUSSELL JAMES
INVENTOR.
AGENT

United States Patent Office 3,022,148
Patented Feb. 20, 1962

This invention relates to processes in which hydrocarbons are reacted with oxygen at elevated temperatures so as to produce valuable product gas streams. The invention further relates to an improved quench process for treating the hot product gas streams generated in such processes. The invention is also concerned with the removal of free carbon formed during the oxidation of said hydrocarbons. In addition, the invention is concerned with recovery of heat which has been transmitted to the quenching fluid by contact with the products of combustion.

A specific application concerns the process of converting hydrocarbon oils into a product gas stream containing hydrogen and carbon monoxide. The oil is reacted in a suitable furnace with an oxygen-containing gas and steam at a high temperature to produce a resulting gas stream, known as synthesis gas. This gas is widely used for the manufacture of valuable compounds such as ammonia, methanol and liquid hydrocarbons. Other processes in which the invention could be profitably utilized include the formation of acetylene from hydrocarbon gases and oxygen, and the high temperature partial oxidation of methane with oxygen.

These processes generate a product gas stream at highly elevated temperatures which must be cooled considerably before it is passed on to other operations. The efficient recovery of this heat in usable form is desirable, in order to improve the overall efficiency of the process. In addition, the gasification usually results in the formation of a certain amount of free carbon. The efficient removal and disposal of this carbon is also a necessary step prior to utilization of the gas stream. Finally, in certain processes a relatively rapid or sudden cooling of the gas stream is necessary in order to preserve the identity of intermediate compounds and prevent the completion of all the high temperature reactions which may take place.

A widely used method of treating the hot gases, such as illustrated in U.S. Patent No. 2,809,104, consists in spraying as a quench a large quantity of water into the gas stream. This quench cooling operation lowers the gas temperature, and also removes a quantity of free carbon. However, the heat is not removed at a very usable temperature level, since most of it is contained in the hot water which is recovered from the quench operation as an outlet stream separate from the product gas stream. Other objections to this method include the fact that carbon must be removed from the hot water in a separate series of operations before the water can be recycled to the quench system. This carbon removal is accomplished either by filtration or by extraction with light hydrocarbon oil. The hot water is then recycled to scrub the product gas stream in a separate operation and finally sent into the quench step. Another drawback to this process is that the product gas stream will contain a relatively large quantity of water vapor. In some cases a drying operation becomes necessary in order to remove some of this water vapor before the gas stream can be processed elsewhere. Finally, a water wash of the product gas stream has limited effectiveness due to the relative insolubility in water of organic and carbonaceous by-products formed in the gas generator.

Another quench method, as in U.S. Patent No. 2,539,434, which has been suggested consists of using a limited amount of hydrocarbon oil as a quench fluid, and thereby cracking a substantial amount of the oil into more useful gaseous components. Thus a quench is accomplished and the heat in the product gas is consumed in a useful manner. However, this method does not provide for removal of free carbon from the product gas stream in the quench cooling step. A subsequent treatment is required for this purpose. In addition, due to the nature of the gaseous components produced from this oil cracking, the process is essentially limited to cases where gasoline is the ultimate end product.

It is an object of this invention to provide an improved process for quench cooling of the hot gases resulting from the partial oxidation of hydrocarbons.

Another object is to provide a process for more efficient and complete removal and disposal of free carbon and other solid particles from the gas stream resulting from the partial oxidation of hydrocarbons.

A further object is to recover the heat generated during the partial oxidation of hydrocarbons in a usable form at a high temperature level.

Still another object is to provide a process for converting the effluent gas stream from the partial oxidation of hydrocarbons into a clear, cool, and relatively hydrocarbon-free gas stream.

Additional objects of this invention will become apparent from the description which follows.

The present invention may be briefly described as an improved quench process for treating hot product gas streams from the partial oxidation of hydrocarbons, in which the gas stream is contacted with a relatively large quantity of recirculating organic liquid, preferably a hydrocarbon oil. The oil or high boiling point organic liquid, as the case may be, is admitted to the quench operation at a relatively high temperature, say about 500° F. However, due to the large quantity and rate of flow the oil temperature does not rise more than 100–200° F. and only a very slight amount of cracking takes place. The free carbon formed in the gas generation is removed by the liquid oil quench, and a portion of the oil is vaporized into the gas stream. This vaporized oil is removed from the gas stream in a subsequent gas-liquid scrubbing operation employing preferably a cooler oil as the liquid scrubbing agent. However, this invention is not restricted to the use of oil as the scrubbing agent. Depending on each individual situation, other liquids, including water, might be employed and subsequently separated from the recovered quench oil.

The hot liquid oil recovered from the quench operation is cooled by passing through a steam boiler in which high pressure steam is generated. Then the cooled oil is separated into two streams, a less dense quench recycle stream and a denser portion containing most of the free carbon and which is suitable for use as fuel.

Following is a discussion of advantages of the process of this invention as compared to the prior art.

Since an organic quench and scrubbing agent is used, the free carbon and other undesirable decomposition products are more effectively removed from the gas stream as compared to water quench and scrubbing systems. The gas-liquid scrubber, in addition to thoroughly removing gaseous organics resulting from the gas generation, also removes and recovers all of the previously vaporized quench oil. Thus the final product gas stream is clear, cold and relatively free of hydrocarbons.

Final disposal of the free carbon is simplified in those cases where hydrocarbon oil is employed as the quench medium, because the free carbon is readily separated from the bulk of the hot liquid effluent as a denser slurry of oil and carbon, readily and directly usable as a fuel.

More efficient heat recovery is achieved in this process, since many suitable organic liquids and especially hydrocarbon oils have a lower volatility than water. Thus the exit gas stream from the quench operation will contain less volatilized quench liquid when a hydrocarbon oil is used as a quench than when water is used. This results in an improved heat economy, because it results in an increased heat removal from the quench operation into the hot liquid effluent rather than in the exit gas stream. Since this hot liquid effluent is employed directly as a heat source for high pressure steam generation, while the exit gas stream is scrubbed with cold oil and the resulting warmed oil from the scrubbing operation is recovered at an intermediate temperature, it is evident that heat recovery from the hot liquid effluent will be at a higher temperature level and therefore in more usable form. Therefore, the greater amount of heat removal into the hot liquid effluent when hydrocarbon oil is employed as a quench medium rather than water leads to a more efficient process. Actually, the use of water as a quench medium would produce an exit gas stream from the gas generator consisting mostly of water vapor under the ranges of process conditions proposed for the process as set forth below.

*Example*

A discussion of a preferred embodiment of this invention will now be given in conjunction with a description of the accompanying figure which represents successive operation in the process. Following the figure with reference to a process of making a synthesis gas mixture of hydrogen and carbon monoxide from Bunker C fuel oil, said process oil to be gasified and steam are preheated to 1000° F. and fed via line 1 to gasification reactor 2. The proportions of oil and steam employed will vary. However, one suitable ratio would be 2 parts of oil to 1 part steam. Preheated oxygen is also passed into reactor 2 via line 3 at 300° F. The quantity of oxygen employed may also vary somewhat, depending on various considerations; such as, the type of oil to be gasified. Higher hydrocarbons would require more oxygen to prevent an undue amount of carbon formation during combustion. One suitable ratio would be 1 part of oxygen to 1 part oil by weight.

Within reactor 2 the oil reacts with the steam and oxygen in the upper refractory-lined section 4, and the gaseous reaction products at a temperature of approximately 2500° F. are quench cooled by a stream of oil sprayed in via line 5 at a temperature of 495° F. Typical physical properties of this type of hydrocarbon oil are: API gravity 36.0, pour point 30° F., flash point 275° F., SUS viscosity @ 100° F. 44 seconds, ASTM color 1½ and average boiling range 500–750° F. A portion of the oil is vaporized into the gas stream and the gas stream is cooled and essentially scrubbed free of carbon by the quench. The resulting gas stream leaving the reactor 2 via line 6 at 600° F. and 350 p.s.i.g. passes into gas-liquid scrubber 7. The gas stream flows upward in the scrubber through a packed section countercurrent to downflowing cool and cold oil streams admitted to the scrubber at temperatures of 225° F. and 100° F. via lines 8 and 9 respectively. Within this packed section the gas stream is further cooled and scrubbed free of residual vaporized quench oil and other organic compounds formed by partial decomposition of the quench oil and process oil during gasification and quench. Also a portion of the water vapor present in the gas stream is condensed to liquid and thereby also removed from the gas stream. The resulting clean and cooled gas stream leaves the scrubber via line 10 at 105° F. It should be noted that the oil employed is essentially non-volatile at 105° F.

The warmed liquid scrubber oil collects at the base of scrubber 7 as a layer 11 above a separate condensed water layer 12. This water layer 12 is run to waste via line 13, or it may be utilized elsewhere to recover heat content. The warmed oil layer leaves via line 14 at a temperature of 400° F. and divides into two streams 15 and 16. Stream 15 joins the quench oil stream 5 as make-up, while stream 16 is cooled to a temperature of 245° F. in passing through low-pressure steam boiler 17, and further cooled by passing through boiler feed water preheater 18. The oil stream leaves the preheater via line 19 at temperature of 225° F. and divides into two streams 8 and 20. Stream 8 passes into the scrubber 7 as previously described, while stream 20 is combined with oil recycle stream 21 and fresh oil makeup stream 22. The source of stream 21 will be described later. The combined streams 20, 21 and 22 flow into cooler 23 where the combined stream is cooled to 100° F. and passes into the scrubber 7 via line 9.

Referring back to the oil gasification reactor 2, the portion of the oil quench stream admitted via 5 which does not vaporize but instead remains liquid, collects toward the bottom of the reactor and is removed at a temperature of 595° F. via line 24. Essentially all of the free carbon formed in the gasification reaction is also removed with the hot effluent oil via line 24. The hot effluent liquid oil then passes through steam boiler 25, and leaves via line 26 cooled to a temperature of 500° F. Stream 26 then divides into streams 27 and 28. Stream 27 is recycled to the oil quench operation together with make-up oil from line 15, combined to give an oil quench stream 5 at a temperature of 495° F.

Stream 28 is passed through cooler 29 and then enters settling tank 30 via line 31 at a temperature of 200° F. In tank 30, essentially all of the free carbon present in the oil is removed as a dense oil and carbon slurry via line 32. This slurry suitable for use as a fuel may be burned and used for preheating streams 1 and 3. The balance of the oil is removed from tank 30 via line 21 as a cool clear oil stream to be utilized as part of the oil wash in scrubber 7 as previously described. It should be noted that carbon removal may be accomplished by other methods such as filtration.

Recovery of heat and generation of relatively high pressure steam is accomplished in boiler 25. The boiler feed water stream 33 is first preheated in unit 18 to a temperature of 240° F. The liquid boiler feed water is then passed via line 34 to heater 35 and is further heated to a temperature of 380° F. and is passed from heater 35 to boiler 25 via line 36. In boiler 25 high pressure steam is generated employing the high temperature level heat available from the hot quench liquid effluent 24. This steam is passed to usage at 550° F. via line 37.

Although specific temperatures, temperature levels, pressures and stream flow quantities are set forth in the preferred embodiment, numerous changes may be made in these variables without departing from the spirit of this invention. Thus, for example, gasification temperatures from a low of about 1800° F. to a high of over 3000° F. may be employed, depending on specific process situations. Also, the pressure range over which this process may be employed is variable. Thus, if applied to acetylene manufacture, essentially atmospheric pressure would exist in the system while the gasification process described in the example may be accomplished at a pressure range from 200 to 600 p.s.i.g. The relative proportions of oil, oxygen and steam also may be varied. Actually, in some cases, as for example the partial oxidation of methane, the use of steam may not necessarily be a part of the gasification process. The gasification process may also be modified to employ, rather than oxygen itself, an oxygen-containing gas such as air or oxygen enriched air.

This process is not limited to gasification of a hydrocarbon oil; partial oxidations of hydrocarbon gases such as methane or even hydrocarbon solids such as powdered coal are contemplated in which this process could be beneficially utilized. Also, the quench liquid does not necessarily have to be hydrocarbon oil; other organic liquids such as chlorinated or fluorinated hydrocarbons may be adaptable to this process. In some cases commercial heat-transfer fluids such as Dowtherm A, which consists of 73.5% diphenyloxide and 26.5% diphenyl, would be suitable for uses as quench liquid. The essential requirements would be a reasonable stability during the quench, a limited volatility at the quench temperature and essentially non-volatility at some lower temperature suitable to the scrubbing operation, relative immiscibility with water so that separate layers of warm quench liquid and water will form in the bottom of the scrubber, reasonable suitability for simple free carbon removal operations such as gravity settling or filtration, and reasonably low viscosity. The choice of a particular organic liquid as a quench fluid would be essentially a problem of engineering economics based on individual process requirements. There would generally be a consumption and slight loss of quench fluid due to considerations such as cracking in the quench operation and unavoidable removal in the product gas stream.

Another modification in the process lying within the scope of the invention is the use of a scrubbing liquid in scrubber 7 which is immiscible with the quench liquid. A second organic liquid immiscible with the quench liquid or even water may be used as the gas scrubbing agent. Such a variation would be employed in cases where the liquid employed as a quench does not possess desirable gas-scrubbing characteristics. For example, in some instances the quench fluid selected may have an appreciable vapor pressure at the scrubbing temperature. Therefore, a scrubbing fluid which is immiscible with the quench fluid, as water, would be suitable as a scrubbing agent. Employment of this modification would be limited to relatively special cases, because the overall heat economy of the process would suffer or else additional heat exchangers would be required. If water was used as the gas scrubbing agent, a large quantity of warm water would be produced. Heat contained in warm water is present at a relatively low level, and its usefulness is limited.

This invention will be found adaptable for usage in numerous installations, and provides a valuable and practical improvement in the art of hydrocarbon gasification. The points of novelty and improved efficiency described above should make the process attractive to existing commercial facilities as well as to proposed new plants and installation.

I claim:

1. In the non-catalytic partial oxidation of hydrocarbon oil by exothermic reaction with free oxygen at temperatures above about 1800° F., wherein the intermediate reaction products are immediately quenched from reaction temperature to a lower temperature level to produce a stable gas stream principally containing hydrogen and carbon monoxide, the improvement which comprises quenching the product gas stream to a temperature between about 500° F. and about 700° F. immediately after said reaction using a hydrocarbon oil at a temperature between about 450° F. and 550° F. as a quench coolant, said hydrocarbon oil being essentially non-volatile at 100° F., thus also removing free carbon from the product gas stream and volatilizing a portion of the hydrocarbon oil, passing the product gas stream to a gas-liquid scrubber in which essentially all of the volatilized portion of the hydrocarbon oil and a portion of the steam present are removed from the product gas stream and the gas stream is further cooled by contact with a cold scrubbing liquid stream of said hydrocarbon oil passed in at a temperature not below 80° F. and not above that temperature at which substantial amounts of hydrocarbon are vaporized, removing from the gas scrubber separate layers of warmed liquid hydrocarbon oil and condensed liquid water, recovering the non-volatilized portion of the hydrocarbon oil together with free carbon from the gas generator as a hot liquid effluent at a temperature between about 500° F. and about 600° F., utilizing said hot liquid effluent as a heat source to generate steam at a temperature above about 350° F., removing from said liquid effluent, not being recycled to quench, a portion of the free carbon contained therein together with some of the hydrocarbon oil as a denser fraction of the liquid effluent stream suitable for use as fuel, and recycling the balance of the liquid effluent stream together with make-up hydrocarbon oil to the gas generator for use as quench oil.

2. Process of generating a gas stream containing principally carbon monoxide and hydrogen by non-catalytic partial oxidation which comprises reacting a hydrocarbon feed material with an oxygen-containing gas at elevated temperature above 1800° F. in a gas generator provided with internal quench means thereby generating a hot gas stream and solid particulate carbon, simultaneously rapidly quench-cooling said hot gas stream from said elevated temperature and removing said solid carbon therefrom by contacting said hot gas stream with a liquid hydrocarbon oil to quench the exothermic reaction between said hydrocarbon and oxygen, thereby heating said oil, separating the cooled hydrogen-carbon monoxide gas stream from said heated oil, cooling said heated oil in heat recovery means, removing solid carbon from said oil, and recycling cooled oil to further contact with said hot gas stream.

3. Process of claim 2, in which substantially complete removal of solid carbon from said oil is accomplished by gravity-settling said oil stream together with solid carbon and drawing off a bottoms portion comprising a sidestream of oil in which said solid carbon has concentrated.

4. Process of claim 2, in which said liquid hydrocarbon oil quench is admitted as a quench at a temperature between about 450° F. and 550° F., heated by contact with said hot gas to a temperature between about 500° F. and 750° F., cooled to a temperature between about 450° F. and 550° F. in heat recovery means comprising a high pressure steam boiler, and recycled in said quench stream.

5. Process for producing a gas stream containing principally carbon monoxide and hydrogen by non-catalytic partial oxidation which comprises reacting a hydrocarbon feed material with an oxygen-containing gas at a temperature above 1800° F. in a gas generator provided with internal quench means, thereby generating a hot gas stream containing hydrogen, carbon monoxide, and solid particulate carbon by exothermic reaction, quenching said hot gas stream with a liquid hydrocarbon oil, thereby suddenly cooling said gas stream, heating said oil, removing said solid carbon from said gas stream into said oil, and partially volatilizing said oil into said gas stream, separating the cooled gas stream containing volatilized oil from the heated oil stream containing solid carbon, cooling said heated oil in heat recovery means, removing solid carbon from said oil, recycling cooled oil to further hot gas contact, and scrub-cooling said gas stream containing volatilized oil with another stream of hydrocarbon oil, said oil stream being substantially non-volatile at the temperature at which it is admitted to said scrub-cooling step, whereby said gas stream is freed of contained volatilized oil.

References Cited in the file of this patent
UNITED STATES PATENTS

| 1,547,191 | Abbott | July 28, 1925 |
|---|---|---|
| 1,796,815 | Ullrich | Mar. 17, 1931 |
| 1,892,534 | Rembert | Dec. 27, 1932 |
| 1,902,746 | Yunker | Mar. 21, 1933 |
| 2,010,376 | Pyzel | Aug. 6, 1935 |
| 2,416,227 | Seyfried | Feb. 18, 1947 |
| 2,665,980 | Carkeek | Jan. 12, 1954 |
| 2,707,147 | Shapleigh | Apr. 27, 1955 |
| 2,781,246 | Goldtrap | Feb. 12, 1957 |
| 2,793,938 | Frank | May 28, 1957 |